United States Patent
Kraeuter et al.

(10) Patent No.: US 12,241,509 B2
(45) Date of Patent: Mar. 4, 2025

(54) DRIVE UNIT FOR A VEHICLE

(71) Applicant: Robert Bosch GmbH, Stuttgart (DE)

(72) Inventors: Janek Kraeuter, Ludwigsburg (DE); Timo Kiekbusch, Ludwigsburg (DE); Tobias Schlittenbauer, Tamm (DE); Witold Techman, Bietigheim-Bissingen (DE); Zhengyu Liu, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 348 days.

(21) Appl. No.: 17/928,961

(22) PCT Filed: May 4, 2021

(86) PCT No.: PCT/EP2021/061686
§ 371 (c)(1),
(2) Date: Dec. 1, 2022

(87) PCT Pub. No.: WO2021/244814
PCT Pub. Date: Dec. 9, 2021

(65) Prior Publication Data
US 2023/0235792 A1    Jul. 27, 2023

(30) Foreign Application Priority Data

Jun. 2, 2020  (DE) .................... 10 2020 206 851.8

(51) Int. Cl.
*F16D 1/10*     (2006.01)
*F16C 33/66*    (2006.01)

(52) U.S. Cl.
CPC ............ *F16D 1/10* (2013.01); *F16C 33/6681* (2013.01); *F16C 2361/61* (2013.01); *F16D 2001/103* (2013.01); *F16D 2300/06* (2013.01)

(58) Field of Classification Search
CPC .... F16D 1/10; F16C 33/6681; F16C 2361/61; F16C 2001/103; F16C 2300/06
(Continued)

(56) References Cited

U.S. PATENT DOCUMENTS 5,295,413 A * 3/1994 Sherman .................. B60K 1/00
                                                              74/421 A
8,232,697 B2 * 7/2012 Chiba ..................... B60K 6/485
                                                              310/113
(Continued)

FOREIGN PATENT DOCUMENTS

DE    102011007254 A1    10/2012
DE    102015211789 A1    12/2016
(Continued)

OTHER PUBLICATIONS

Translation of International Search Report for Application No. PCT/EP2021/061686 dated Jul. 8, 2021 (2 pages).

*Primary Examiner* — Colby M Hansen
(74) *Attorney, Agent, or Firm* — Michael Best & Friedrich LLP

(57) ABSTRACT

The invention relates to a drive unit (10) for a vehicle, comprising an electric machine (12) having a rotor shaft (14) and a transmission (16) having a transmission shaft (18). According to the invention, the rotor shaft (14) and the transmission shaft (18) are interlocking and coupled by means of an interlocking toothing (44), wherein a lubricant channel (46) is formed in the transmission shaft (18), which feeds into an inner space (48) of the rotor shaft (14) at the end facing the rotor shaft (14) in order to provide lubricant for the interlocking toothing (44), wherein the rotor shaft (14) has an end side (50) at the axial end facing the transmission shaft (18), on which end side one or more openings (52) are formed, extending from an inner circumference (54) of the rotor shaft (14) bordering the inner space (48) to the outer circumference (56) thereof, such that the lubricant channel (46) is fluidically connected to the openings (52) via the inner space (48) and the interlocking toothing (44).

10 Claims, 3 Drawing Sheets

(58) Field of Classification Search
USPC .......................................................... 464/16
See application file for complete search history.

(56) References Cited

U.S. PATENT DOCUMENTS

| | | | | |
|---|---|---|---|---|
| 8,678,937 | B2* | 3/2014 | Humes | F16D 1/10 |
| | | | | 464/7 |
| 8,899,910 | B2* | 12/2014 | Makulec | F01D 25/18 |
| | | | | 184/6.11 |
| 9,641,039 | B2* | 5/2017 | Smetana | F16C 35/06 |

FOREIGN PATENT DOCUMENTS

| | | |
|---|---|---|
| DE | 102018210452 A1 | 1/2020 |
| WO | 2014008896 A1 | 1/2014 |
| WO | 2020011449 A1 | 1/2020 |

* cited by examiner

DRIVE UNIT FOR A VEHICLE

BACKGROUND OF THE INVENTION

The invention relates to a drive unit for a vehicle, the drive unit comprising an electric machine having a rotor shaft and a transmission having a transmission shaft.

Drive units of the type mentioned at the outset are known from the prior art as electrified axles, for example from DE 102018210452 A1.

DE 102015211 789 A1 discloses a gear arrangement that has a lubricating oil-conducting hollow shaft on which a centrifugal disk is arranged at the end in order to guide lubricating oil past transmission components and to supply said lubricating oil to an oil sump.

SUMMARY OF THE INVENTION

The problem addressed by the invention is solved by a drive unit for a vehicle according to the invention.

According to the invention, a drive unit for a vehicle is proposed that has an electric machine having a rotor shaft and a transmission having a transmission shaft. The rotor shaft and the transmission shaft are (axially) interlocking and coupled by means of an interlocking toothing. A lubricant channel is formed in the transmission shaft and feeds into an inner space of the rotor shaft at the end facing the rotor shaft (on the end side) in order to provide lubricant for the interlocking toothing. At the axial end, which faces the transmission shaft, the rotor shaft has an end side, wherein one or more openings are formed on the end side, extending from an inner circumference of the rotor shaft bordering the inner space to the outer circumference thereof. The lubricant channel is thus fluidically connected to the openings via the inner space and the interlocking toothing. This fluidic connection guides lubricant from the lubricant channel in the transmission shaft to the end-side openings of the rotor shaft.

In this way, improved lubrication and cooling of the interlocking toothing can be achieved. Further transmission components can be lubricated and/or cooled by further guiding the lubricant to the openings on the end side. The design of a lubricant flow through existing components allows a higher degree of integration. This contributes to minimizing weight, a compact installation space and reducing costs.

The fluidic connection along which the lubricant is conveyed has a virtually hairpin-shaped profile. The lubricant is introduced into the lubricant channel and flows to the end of the transmission shaft facing the rotor shaft. There, the lubricant feeds into an inner space of the rotor shaft (hollow portion of the rotor shaft). When the rotor shaft or transmission shaft is rotating, the lubricant is guided radially outward to the interlocking toothing by centrifugal force. From there, lubricant is guided to the openings in the end side of the rotor shaft. In this case, the lubricant extends somewhat counter to the running direction of the lubricant in the lubricant channel of the transmission shaft.

The electric machine can have a housing (motor housing). On the end facing away from the transmission, the electric machine or the housing thereof can have a bearing shield having a roller bearing in which the rotor shaft is mounted. If necessary, no further mounting for the rotor shaft is provided in the electric machine.

The transmission can also have a housing (transmission housing).

The motor housing and the transmission housing can each have a parting plane on which the motor housing and the transmission housing rest against one another. The parting planes can each be arranged orthogonally to the central longitudinal axis of the rotor shaft or the transmission shaft. Alternatively, the motor housing and the transmission housing can be combined to form a component or a housing, for example a housing or system housing. The housing is then a component (no separation on a parting plane).

The transmission shaft can be, for example, a transmission input shaft. The transmission shaft can carry a pinion that engages or meshes with further gear wheels. The transmission housing can optionally be formed in multiple parts, for example with a (middle) housing portion and a transmission cover.

The transmission shaft can be mounted by means of two roller bearings. A roller bearing can be arranged on or in the transmission housing, for example in the middle housing portion, and a further roller bearing can be arranged on or in the transmission cover.

The lubricant channel can extend completely through the transmission shaft. The transmission shaft can thus be designed as a hollow shaft. The drive unit can be designed, for example, as an E-axis or form a component of an E-axis. The lubricant can be, for example, oil. The rotor shaft and the transmission shaft are in particular arranged coaxially with respect to one another.

To provide the interlocking toothing, the rotor shaft has an internal toothing on its inner circumference (in some portions axially) and the transmission shaft has an external toothing on its outer circumference (in some portions axially). If the rotor shaft and the transmission shaft are interlocking, the external toothing and the internal toothing are in engagement with one another. The rotor shaft and the transmission shaft are thus coupled to one another in a rotationally fixed manner.

According to one development, the openings can extend from the inner circumference to the outer circumference of the rotor shaft along the radial direction or at an angle to the radial direction. This results in a conveying effect due to the centrifugal force acting on the lubricant when the rotor shaft or transmission shaft is rotating.

According to one development, the openings on the end side can be distributed regularly over the circumference, for example at the same distances or the same angles over the circumference of the rotor shaft. This promotes uniform delivery of lubricant.

According to one development, the openings on the end side can be designed as grooves. Grooves can be easily formed, for example, in comparison to bores. Due to the grooves, there is only a comparatively low weakening of the rotor shaft or of the hollow portion of the rotor shaft.

According to one development, a lubricant delivery point for introducing lubricant into the lubricant channel of the transmission shaft can be arranged in the transmission. Targeted provision of lubricant is thus possible. The lubricant delivery point can be arranged on the end of the transmission shaft facing away from the rotor shaft, for example on the transmission cover side.

The lubricant delivery point can be supplied (actively or passively) with lubricant by means of a lubricant delivery device. For actively conveying lubricant, a lubricant pump can be provided that can be arranged, for example, in the transmission. In embodiments without a lubricant pump (passive sump lubrication), the lubricant can be guided into the transmission shaft by means of corresponding guide geometries (for example formed in the housing).

According to one development, a lubricant retaining cap can be arranged in the lubricant channel at the end of the transmission shaft facing away from the rotor shaft. This prevents the outflow of lubricant or oil at the end of the transmission shaft facing away from the rotor shaft. The lubricant retaining cap can have an annular profile. The lubricant retaining cap can be designed to be open in the middle, for example with a central passage in order to allow the introduction of lubricant.

According to one development, a support portion can be formed (axially) between the interlocking toothing and the axial end of the rotor shaft (facing the transmission shaft), in which support portion the rotor shaft (having an inner circumference) and the transmission shaft (having an outer circumference) rest against one another, wherein grooves are formed in the support portion on the transmission shaft and/or the rotor shaft, which grooves extend between the interlocking toothing and the axial end of the rotor shaft. Grooves in the support portion promote the supply of lubricant from the plug connection to the openings or grooves on the end side of the rotor shaft. The grooves extend in particular from the interlocking toothing to the axial end of the rotor shaft. Specifically, the grooves can extend in parallel with the axial direction or enclose an angle with respect to the axial direction or a line parallel to the axial direction.

According to one development, the transmission shaft can be guided through a roller bearing arranged in the transmission housing or seated in the transmission housing, wherein the rotor shaft rests indirectly (for example by means of an intermediate ring seated on the transmission shaft) or directly with the end side (facing the transmission shaft) against the inner ring of the roller bearing. As a result, the rotor shaft can be axially supported. The transmission of a relative force between the rotor shaft and the transmission shaft, for example in the region of the interlocking toothing or the support portion, is thus avoided by the support on the inner ring.

According to one development, a radial shaft seal, seated in the transmission housing, can be arranged in the region in which the rotor shaft and the transmission shaft are interlocking (axial overlap of the rotor shaft and the transmission shaft). The lubricant can thus be used for lubricating the radial shaft seal. The lubricant can flow through a lubricant channel (oil bore) back into an oil sump of the drive unit or of the transmission or through the roller bearing.

BRIEF DESCRIPTION OF THE DRAWINGS

Possible embodiments of the invention will be explained below with reference to the accompanying drawings. In the drawings.

DETAILED DESCRIPTION

Figure 1:
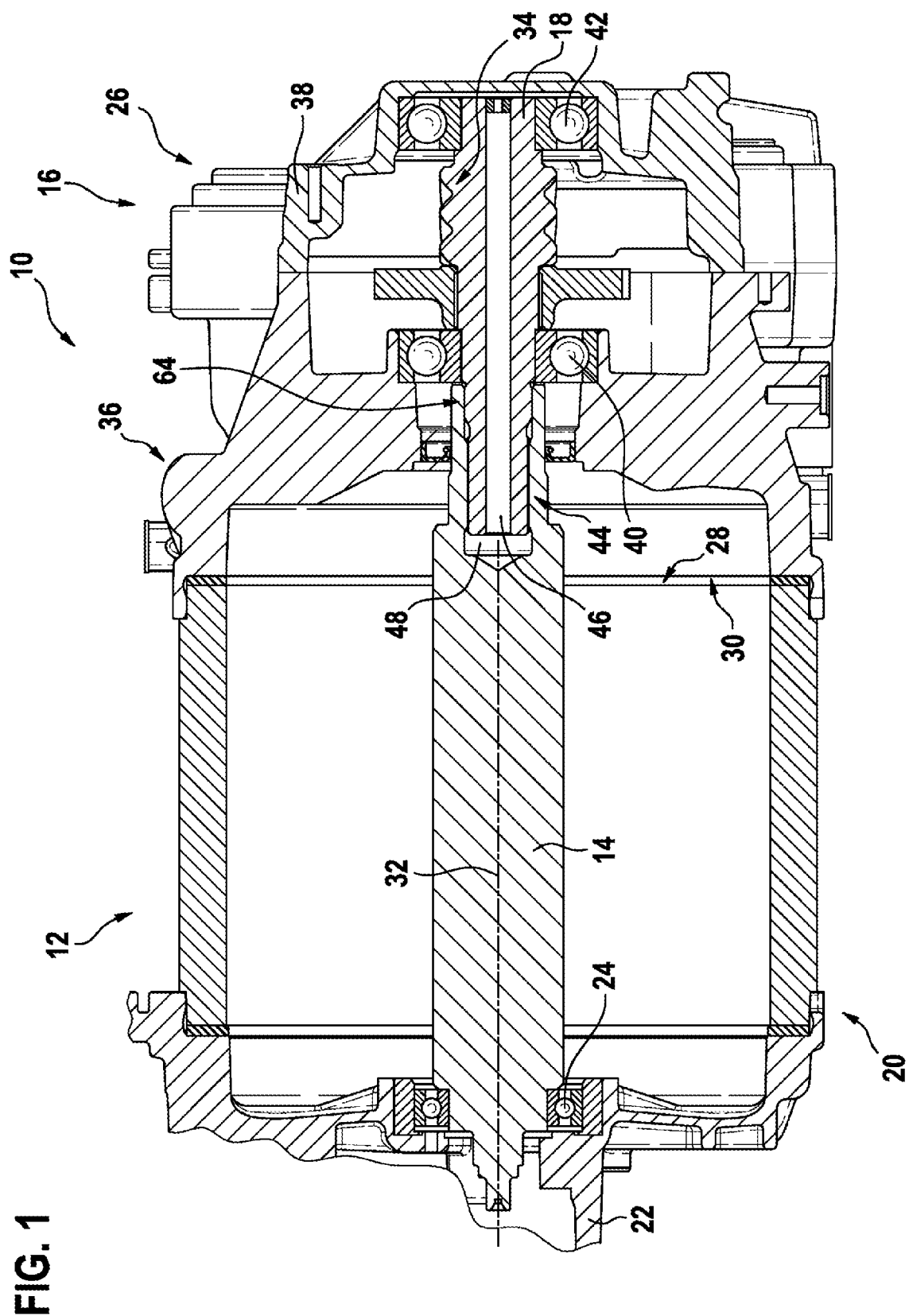
FIG. 1 is a schematic sectional view through a drive unit.

The drive unit for a vehicle overall bears the reference sign 10 in FIG. 1. The drive unit 10 can be designed as an E-axle or form a component of an E-axle, for example.

The drive unit 10 has an electric machine 12 having a rotor shaft 14 and a transmission 16 having a transmission shaft 18. A stator and a rotor coupled to the rotor shaft 14 can also be arranged in the electric machine 12, which rotor has rotor components, for example a laminated core having windings (not shown).

The electric machine 12 has a housing 20 (motor housing). In the example, the electric machine 12 or the housing 20 thereof has, on the end facing away from the transmission 16, a bearing shield 22 having a roller bearing 24 in which the rotor shaft 14 is mounted (see FIG. 1). In the example, no further mounting for the rotor shaft 14 is provided in the electric machine 12.

The transmission 16 also has a housing 26 (transmission housing). In the example, the motor housing 20 and the transmission housing 26 each have a parting plane 28, 30 on which the motor housing 20 and the transmission housing 26 rest against one another. In the example, the parting planes 28, 30 are in each case orthogonal to the central longitudinal axis 32 (axial direction 32) of the rotor shaft 14 or the transmission shaft 18. As an alternative to this (not shown), the motor housing 20 and the transmission housing 26 can be combined to form a single component, for example a housing or system housing (no separation on the parting plane 28/30).

The transmission shaft 18 is a transmission input shaft. In the example, the transmission shaft 18 carries a pinion 34 that engages with further gear wheels (not shown). In the example, the transmission housing 26 is formed in multiple parts and has a housing portion 36 adjoining the motor housing and a transmission cover 38.

The transmission shaft 18 is mounted in the transmission housing 26 by means of two roller bearings 40, 42. A roller bearing 40 is arranged on or in the housing portion 36, and a further roller bearing 42 is arranged on or in the transmission cover 38.

Figure 2:
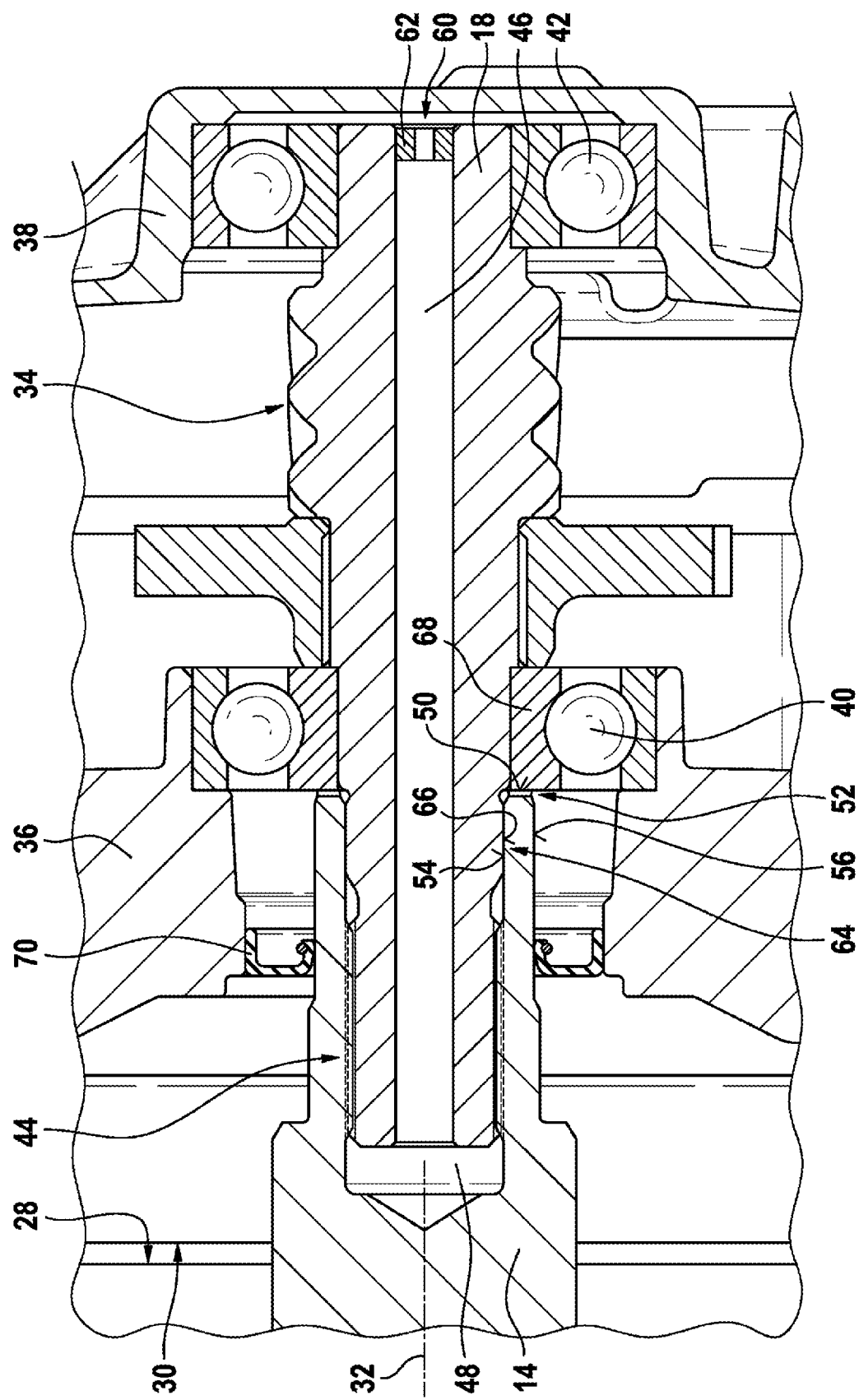
FIG. 2 is a schematic and enlarged partial section of the drive unit from FIG. 1 in the region of the transmission shaft.

The rotor shaft 14 and the transmission shaft 18 are (axially) interlocking and coupled by means of an interlocking toothing 44 (see FIG. 2). The rotor shaft 14 and the transmission shaft 18 are arranged coaxially with respect to one another. A lubricant channel 46 is formed in the transmission shaft 18 and feeds into an inner space 48 of the rotor shaft 14 at the end facing the rotor shaft 14 (on the end side) in order to provide lubricant for the interlocking toothing 44 44.

Figure 3:
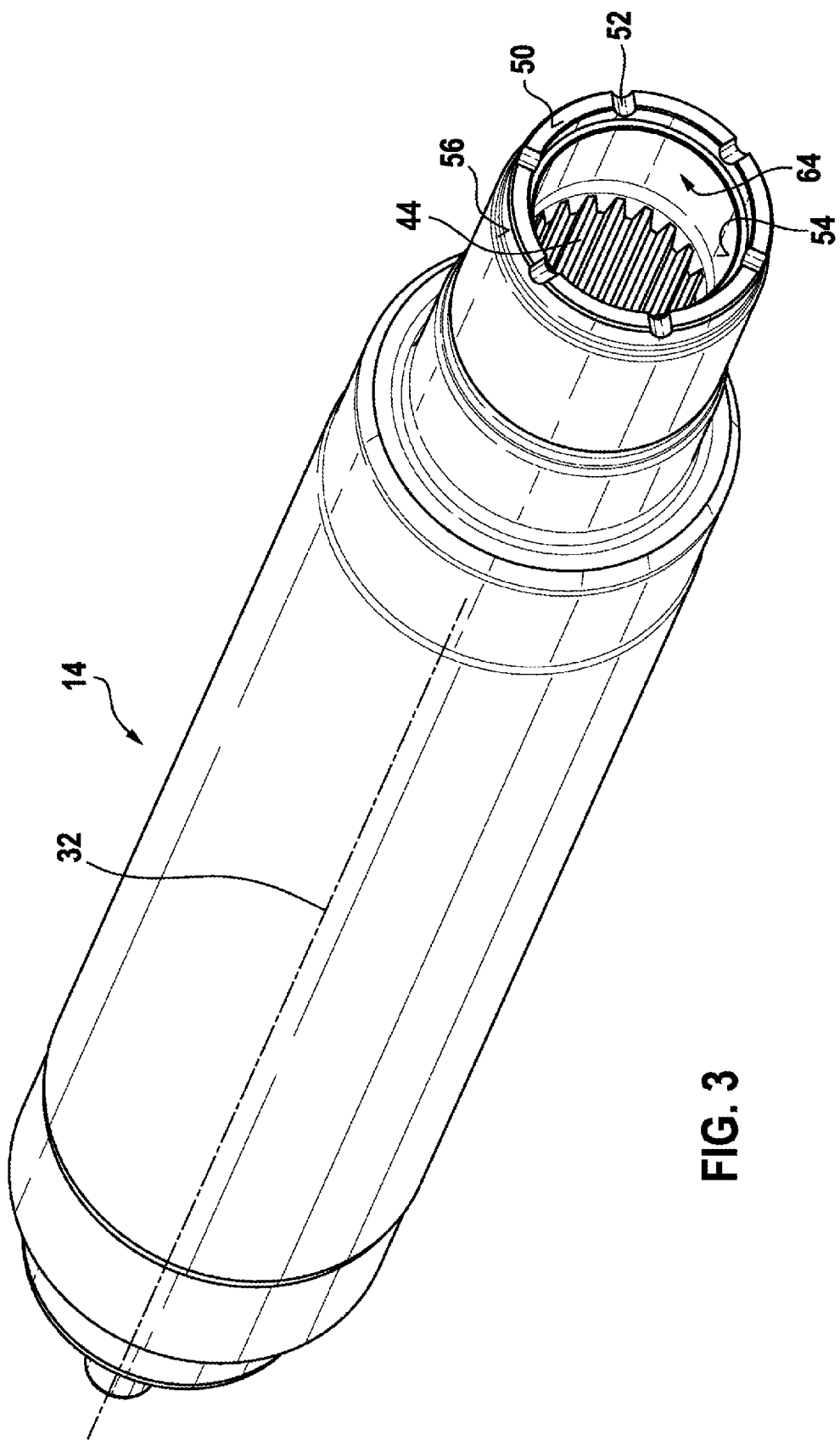
FIG. 3 is a schematic and perspective view of the rotor shaft of the drive unit from FIG. 1.

At the axial end, which faces the transmission shaft 18, the rotor shaft 14 has an end side 50, wherein one or more openings 52 are formed on the end side 50, extending from an inner circumference 54 of the rotor shaft 14 bordering the inner space to the outer circumference 56 thereof (see FIGS. 2 and 3). The lubricant channel 46 is thus fluidically connected to the openings 52 via the inner space 48 and the interlocking toothing 44. This fluidic connection guides lubricant from the lubricant channel 46 in the transmission shaft 18 to the openings 52 on the end face of the rotor shaft 14.

In the example, the lubricant channel 46 extends completely through the transmission shaft 18 (see FIG. 2). The transmission shaft 18 is thus designed as a hollow shaft. The lubricant can be, for example, oil.

The openings 52 extend from the inner circumference 54 to the outer circumference 56 of the rotor shaft 14 along the radial direction or at an angle to the radial direction. This results in a conveying effect due to the centrifugal force acting on the lubricant when the rotor shaft 14 or transmission shaft 18 is rotating.

The openings 52 are distributed regularly over the circumference on the end side 50, for example at the same distances or angles over the circumference of the rotor shaft 14 (see FIG. 3). The openings 52 on the end side 50 are designed as grooves.

A lubricant delivery device (not shown) for introducing lubricant at a lubricant delivery point 60 into the lubricant channel 46 of the transmission shaft 18 is arranged in the transmission (see FIG. 2). The lubricant delivery device is arranged on the end of the transmission shaft 18 (transmission cover side) facing away from the rotor shaft 14.

The lubricant delivery device can be designed as described above.

A lubricant retaining cap 62 is arranged in the lubricant channel 46 on the end of the transmission shaft 18 facing away from the rotor shaft 14. The lubricant retaining cap 62 has an annular profile having a central passage (without a reference sign).

A support portion 64 is formed axially between the interlocking toothing 44 and the axial end (facing the transmission shaft 18) of the rotor shaft 14, in which support portion the rotor shaft 14 having the inner circumference 54 and the transmission shaft 18 having an outer circumference 66 rest against one another (see FIG. 2). In the support portion 64, grooves (not shown) can be formed on the transmission shaft 18 and/or on the rotor shaft 14, which grooves extend between the interlocking toothing 44 and the axial end of the rotor shaft 14. The grooves extend in particular from the interlocking toothing to the axial end of the rotor shaft, for example parallel to the axial direction 32 or at an angle to the axial direction or a line parallel to the axial direction 32.

The transmission shaft 18 is guided through the roller bearing 40 arranged or seated in the transmission housing 26, wherein the rotor shaft 14 rests directly with the end side 50 (facing the transmission shaft 18) against the inner ring 68 of the roller bearing 40 (see FIG. 2).

A radial shaft seal 70, seated in the transmission housing 26, is arranged in the region in which the rotor shaft 14 and the transmission shaft 18 are interlocking (axial overlap of the rotor shaft 14 and the transmission shaft 18). The lubricant can thus be used for lubricating the radial shaft seal 70. The lubricant can flow through a lubricant channel (oil bore) back into an oil sump of the drive unit 10 or of the transmission 16 or through the roller bearing 40 (not shown in detail).

The fluidic connection along which the lubricant is conveyed has, for example, a hairpin-shaped or reciprocating profile (see FIG. 2). The lubricant is introduced into the lubricant channel 46 and flows to the end of the transmission shaft 18 facing the rotor shaft 14. There, the lubricant channel 46 feeds into the inner space 48 of the rotor shaft 14 (hollow portion of the rotor shaft) such that the lubricant ends up in the inner space 48. When the rotor shaft 14 or transmission shaft 18 is rotating, the lubricant is guided radially outward to the interlocking toothing 44 by centrifugal force. From there, lubricant is guided to the openings 52 in the end side 50 of the rotor shaft 14.

In this case, the lubricant extends somewhat counter to the running direction of the lubricant in the lubricant channel 46 of the transmission shaft 18.

The invention claimed is:

1. A drive unit (10) for a vehicle, the drive unit comprising an electric machine (12) having a rotor shaft (14) and a transmission (16) having a transmission shaft (18),
   wherein the rotor shaft (14) and the transmission shaft (18) are interlocking and coupled by an interlocking toothing (44), wherein a lubricant channel (46) is formed in the transmission shaft (18), which lubricant channel feeds into an inner space (48) of the rotor shaft (14) at an end facing the rotor shaft (14) in order to provide lubricant for the interlocking toothing (44), wherein the rotor shaft (14) has an end side (50) at an axial end facing the transmission shaft (18), on which end side one or more openings (52) are formed, extending from an inner circumference (54) of the rotor shaft (14) bordering the inner space (48) to an outer circumference (56) thereof, such that the lubricant channel (46) is fluidically connected to the openings (52) via the inner space (48) and the interlocking toothing (44).

2. The drive unit (10) according to claim 1, wherein the openings (52) extend from the inner circumference (54) to the outer circumference (56) of the rotor shaft (14) along a radial direction or at an angle with respect to the radial direction.

3. The drive unit (10) according to claim 1, wherein the openings (52) on the end side (50) are distributed regularly over the inner circumference.

4. The drive unit (10) according to claim 1, wherein the openings (52) on the end side (50) are designed as grooves.

5. The drive unit (10) according to claim 1, wherein a lubricant delivery point (60) for introducing lubricant into the lubricant channel (46) of the transmission shaft (18) is arranged in the transmission (16).

6. The drive unit (10) according to claim 1, wherein a lubricant retaining cap (62) is arranged in the lubricant channel (46) at an end of the transmission shaft (18) facing away from the rotor shaft (14).

7. The drive unit (10) according to claim 1, wherein a support portion (64) is formed between the interlocking toothing (44) and the axial end of the rotor shaft (14), in which support portion the rotor shaft (14) and the transmission shaft (18) rest against one another, wherein grooves are formed in the support portion (64) on the transmission shaft (18) and/or the rotor shaft (14), which grooves extend between the interlocking toothing (44) and the axial end of the rotor shaft (14).

8. The drive unit (10) according to claim 1, wherein the transmission shaft (18) is guided through a roller bearing (40) arranged/seated in the transmission housing (26), wherein the rotor shaft (14) rests indirectly or directly with the end side (50) against an inner ring (68) of the roller bearing (40).

9. The drive unit (10) according to claim 1, wherein a radial shaft seal (70), seated in the transmission housing (26), is arranged in a region in which the rotor shaft (14) and the transmission shaft (18) are interlocking.

10. The drive unit (10) according to claim 1, wherein the openings (52) on the end side (50) are distributed regularly over the outer circumference.

* * * * *